(12) United States Patent
Lipp et al.

(10) Patent No.: US 8,476,365 B2
(45) Date of Patent: Jul. 2, 2013

(54) METHOD FOR GAS PHASE POLYMERIZATION

(75) Inventors: Charles W. Lipp, Lake Jackson, TX (US); David Denton, Angleton, TX (US); Bruce J. Gertner, Victoria, TX (US)

(73) Assignee: Dow Global Technologies, LLC, Midland, MI (US)

( * ) Notice: Subject to any disclaimer, the term of this patent is extended or adjusted under 35 U.S.C. 154(b) by 185 days.

(21) Appl. No.: 12/864,192

(22) PCT Filed: Jan. 23, 2009

(86) PCT No.: PCT/US2009/031778
§ 371 (c)(1),
(2), (4) Date: Jul. 22, 2010

(87) PCT Pub. No.: WO2009/094505
PCT Pub. Date: Jul. 30, 2009

(65) Prior Publication Data
US 2010/0298493 A1    Nov. 25, 2010

Related U.S. Application Data

(60) Provisional application No. 61/023,298, filed on Jan. 24, 2008.

(51) Int. Cl.
*C08F 2/44*    (2006.01)

(52) U.S. Cl.
USPC .......................... 524/849; 239/589; 239/597

(58) Field of Classification Search
USPC ................................. 524/849; 239/589, 597
See application file for complete search history.

(56) References Cited

U.S. PATENT DOCUMENTS

| | | | |
|---|---|---|---|
| 5,037,616 A | | 8/1991 | Williatte et al. |
| 5,317,036 A | | 5/1994 | Brady, III et al. |
| 5,541,270 A | | 7/1996 | Chinh et al. |
| 5,693,727 A | | 12/1997 | Goode et al. |
| 5,962,606 A | * | 10/1999 | Williams et al. ............... 526/88 |
| 6,075,101 A | | 6/2000 | Lynn et al. |

FOREIGN PATENT DOCUMENTS

| | | |
|---|---|---|
| GB | 2274110 A | 7/1994 |
| JP | 61207402 A | 9/1986 |
| WO | 9837101 A1 | 8/1998 |
| WO | 02087776 A1 | 11/2002 |

OTHER PUBLICATIONS

International Search Report issued in PCT/US2009/031778, dated May 11, 2009.

* cited by examiner

*Primary Examiner* — Edward Cain

(57) ABSTRACT

Disclosed is a catalyst injection nozzle that comprises an outer tube with an open end, a nozzle tip with a diameter connected to the outer tube open end, an orifice connected to the nozzle tip internal to the outer tube, an internal mixing zone connected to the orifice internal to the outer tube, an inner tube residing within the outer tube further comprising an open end connected to the internal mixing zone, where a steady-state, uniform two-phase flow regime between an atomizing gas and at least one liquid catalyst feed does not form in the internal mixing zone at an atomizing gas to liquid catalyst feed flow ratio of about 0.05 to about 10.

13 Claims, 6 Drawing Sheets

(a)

(b)

(c)

(d)

METHOD FOR GAS PHASE POLYMERIZATION

CROSS-REFERENCE TO RELATED APPLICATIONS

This application claims the priority benefit under 35 USC §119(e) to U.S. Provisional Patent Application No. 61/023, 298, filed Jan. 24, 2008.

FIELD OF THE INVENTION

The present invention relates to a nozzle for introducing one or more catalyst components into a gas-phase polymerization reactor to achieve a particular particle size distribution. Embodiments also relate to methods for producing polymers with a specific particle size distribution. Embodiments also relate to compositions containing polymers produced by the methods disclosed.

BACKGROUND

Catalysts in liquid form have been used to produce polymers to control properties such as particle size distribution and flowability. Examples of liquid catalysts include, but are not limited to, metallocene catalysts and Ziegler-Natta catalysts. Other liquid catalysts include catalysts incorporating transition metals—Group IV, V, and VI metals—that have at least one π-bonded ligand.

Catalysts are injected as a liquid feed into a polymerization reaction to obtain better control over the reaction, to optimize the thermodynamics of the reaction, and to control the particle size distribution (PSD) of the polymers. PSD affects polymer properties such as flow characteristics of the polymer particles, the carbon black loading of the polymers, the ability to purge the polymer particles, the degree of segregation in packaging of the polymer, the amount of scrap generated, and the overall consistency of the polymer. Further, tails of the production, the fines and oversize particles, represent wasted material in the production of the polymers.

Particle size has been traditionally controlled by mechanical methods such as sieving. These methods are generally carried out after the polymers have been removed from the polymerization reactor.

U.S. Pat. No. 5,317,036 (Brady, III, et al.) describes gas-phase polymerization of olefins by using liquid catalysts. U.S. Pat. No. 5,693,727 (Goode, et al.) discloses controlling polymer PSD by spraying liquid catalysts into a zone that is polymer particle lean. The previously described processes control particle size by allowing a brief period of time for the droplets of liquid catalyst to disperse into the gas phase before contacting the polymer fluidization bed by using a purge gas to deflect polymer particles from the inlet catalyst stream.

SUMMARY

Disclosed is a catalyst injection nozzle that comprises an outer tube with an open end, a nozzle tip with a diameter connected to the outer tube open end, an orifice connected to the nozzle tip internal to the outer tube, an internal mixing zone connected to the orifice internal to the outer tube, an inner tube residing within the outer tube further comprising an open end connected to the internal mixing zone, where a steady-state, uniform two-phase flow regime between an atomizing gas and at least one liquid catalyst feed does not form in the internal mixing zone at an atomizing gas to liquid catalyst feed flow ratio of about 0.05 to about 10.

Disclosed is a method for producing a polymer in a gas phase polymerization reactor with at least one catalyst injection nozzle, comprising feeding at least one monomer into the gas phase polymerization reactor, and injecting at least one liquid catalyst with an atomizing gas through the at least one catalyst injection nozzle into the polymerization reactor, where injecting the at least one liquid catalyst at gas phase polymerization conditions initiates a polymerization reaction with the at least one monomer, and where the at least one liquid catalyst is selected from the group comprising a liquid catalyst, a slurry-based catalyst, and a combination thereof.

Disclosed is a substantially friable polymer composition produced by the method where the polymer composition has an absence of a catalyst support and comprises an unfiltered mass averaged particle size distribution ranging from about 1.5 to about 3.5.

BRIEF DESCRIPTION OF THE DRAWINGS

The foregoing summary as well as the following detailed description will be better understood when read in conjunction with the appended drawings. It should be understood, however, that the invention is not limited to the precise arrangements and instrumentalities shown. The components in the drawings are not necessarily to scale, with emphasis instead being placed upon clearly illustrating the principles of the present invention. Moreover, in the drawings, like reference numerals designate corresponding parts throughout the several views.

DETAILED DESCRIPTION

The following discussion is presented to enable a person skilled in the art to make and use the disclosed compositions and methods. The general principles described may be applied to embodiments and applications other than those detailed without departing from the spirit and scope of the disclosed compositions and methods. The disclosed compositions and methods are not intended to be limited to the embodiments shown, but is to be accorded the widest scope consistent with the principles and features disclosed.

Embodiment nozzles are designed for producing a polymer with a substantially narrow particle size distribution in a gas phase polymerization reactor under normal gas phase processing conditions. Embodiment methods using the embodiment nozzles for producing a polymer with a substantially narrow particle size distribution in a gas phase polymerization reactor. Embodiment polymer compositions are made using the embodiment nozzles in a gas phase polymerization reactor at gas phase polymerization conditions.

The term "particle size distribution" (PSD) refers to the overall range of particle sizes (from coarse to fine). The term "nozzle" refers to a mechanical device designed to control the flow characteristics of a fluid. The term "flow characteristics of a fluid" refers to the properties of a fluid impacted by the flow regime. An example of a flow regime is dispersed flow, which refers to a multiphase fluid-flow regime characterized by a gas phase being distributed through a liquid phase. The term "polymer" refers to elastomeric macromolecules comprising long chains of chemically-bonded atoms. The atoms in the long chain may be carbon, hydrogen, oxygen or silicon. The term "olefin" refers to an alkene, distinguished by having at least one double bond within its structure. An "α-olefin" or "1-olefin" specifically refers to alkenes with the at least one double bond between the first and second carbon atoms of the compound.

The embodiments as described improve the operatability and stability of a gas phase polymerization reaction over methods and means described in the prior art. Some embodiments provide a nozzle that reduces the variability of liquid catalyst and atomizing gas flows and stabilizes the catalyst nozzle pressure drop. The position of the support tube exit relative to the injection nozzle tip is critical in providing control and stability to the catalyst injection nozzle—a fact not recognized in the prior art. This stability permits greater control of atomizing gas:liquid catalyst feed ratio, thereby potentially resulting in a narrower product polymer PSD. A narrower product polymer PSD produces less waste by limiting fines and oversized particle creation after the catalyst emerges from the particle lean zone. Some embodiments provide a method for producing polymer products with a narrower product polymer PSD than capable of being produced by the prior art.

Figure 1:
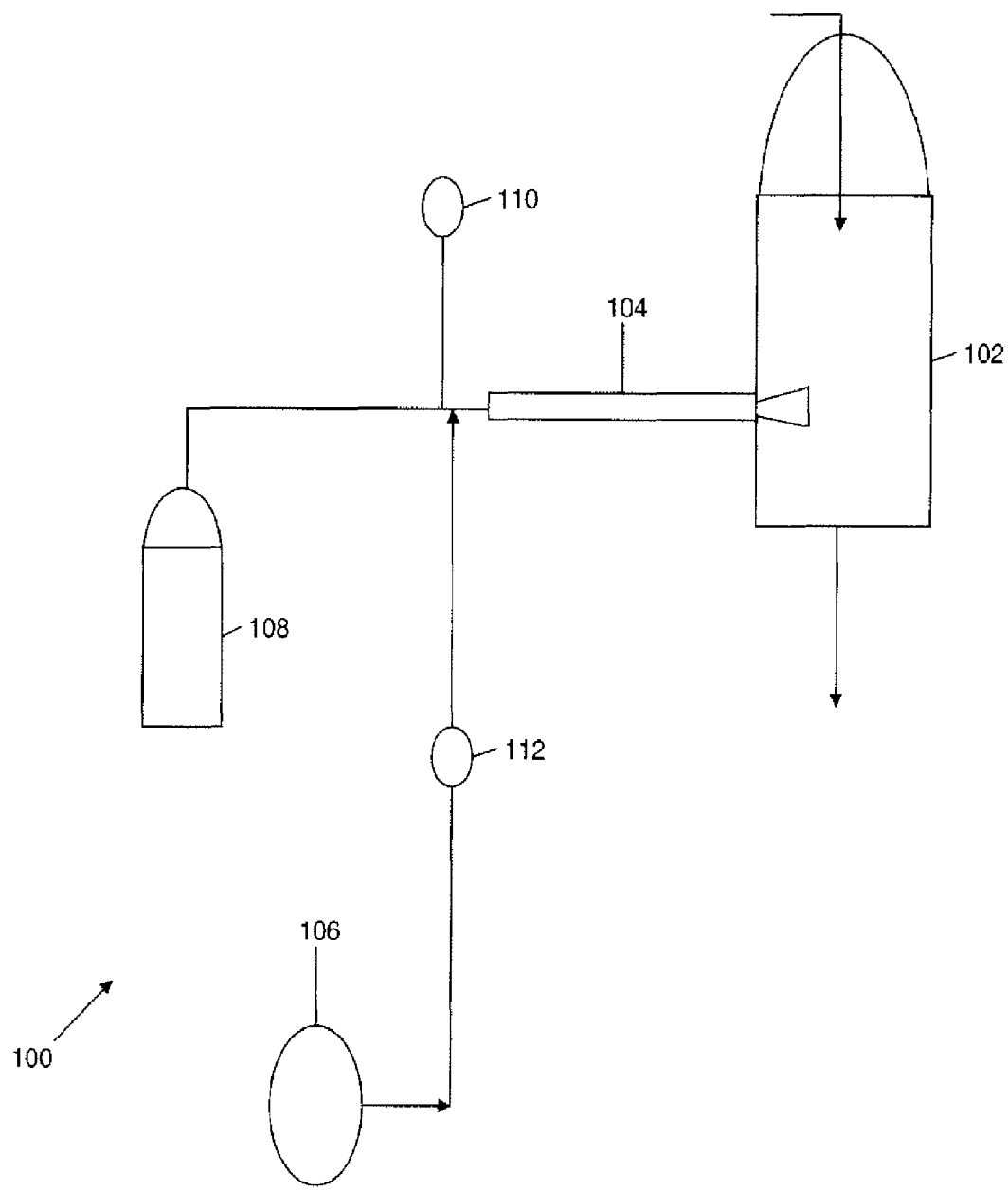
FIG. 1 illustrates a simplified polymerization with liquid catalyst injection system.

FIG. 1 illustrates a simplified polymerization with liquid catalyst injection system 100. System 100 may be used for manufacturing one or more polymers either in a continuous or batch-wise manner. In some embodiments, system 100 includes a polymerization reactor 102, a catalyst injection nozzle 104, an atomization gas source 106, a liquid catalyst storage tank 108, a pitot meter 110, and a liquid flow meter 112. Elements within system 100 are connected using feed lines. Examples of feed lines are well known in the art and include, but are not limited to, pipes, tubes, and pressure resistant piping. Feed lines may further comprise one or more valves, gas traps, vents, and other pipeline fixtures known in the art.

Examples of polymerization reactors 102 include, but are not limited to, a continuous stirred-tank reactor (CSTR), a plug flow reactor (PFR), and a tubular reactor. In some embodiments, polymerization reactor 102 is a gas phase polymerization reactor. In such embodiments, polymerization reactor 102 may be a gas phase fluid bed reactor. Polymerization reactor 102 may also include at least one feed mixer, distributor, or nozzle attachment where a feed component needs to be dispersed evenly into the mixture within the polymerization reactor 102.

The process of manufacturing the polymers using system 100 includes adding at least one monomer into the polymerization reactor 102 and extracting a polymer product from the polymerization reactor 102. In some embodiments, additional components may be injected into the polymerization reactor 102 to affect the polymerization process. Monomers and additional components are added using one or more inlets present on polymerization reactor 102. Polymer product is extracted from polymerization reactor 102 by one or more outlets present on polymerization reactor 102.

A liquid catalyst feed is used as part of the process for manufacturing polymers in system 100. The liquid catalyst feed is injected into the polymerization reactor 102 using a catalyst injection nozzle 104. In some embodiments, polymerization reactor 102 may have more than one nozzle similar to catalyst injection nozzle 104 to inject one or more liquid catalyst feeds. Catalyst injection nozzle 104 may be constructed out of process-inert materials, such as 316 stainless steel or MONEL™ (Specialty Metals Corp.; New Hartford, N.Y.). In some embodiments, the catalyst injection nozzle 104 is configured to handle a liquid catalyst feed injected with assistance from an atomizing gas. A mixture of liquid catalyst feed and atomizing gas may be referred to as "gas-assisted liquid catalyst feed". In such embodiments, the catalyst injection nozzle 104 may possess a tube-in-tube type design. In some embodiments, the length of catalyst injection nozzle 104 may have a ratio to the diameter of polymerization reactor 102 of about 1:4. In some other embodiments, the length of the catalyst injection nozzle 104 may have a predefined ratio with the diameter of its exit orifice.

In such embodiments where an atomizing gas is included, the atomizing gas is provided to catalyst injection nozzle 104 from an atomizing gas source 106, which is a storage facility for the atomizing gas. Examples of atomizing gas source 106 include, but are not limited to, cylinders, canisters, storage tanks, and cryogenic containers. In some embodiments, pitot meter 110 is attached to the feed line carrying the atomizing gas from atomizing gas source 106 to catalyst injection nozzle 104 to measure the flow rate to the of the atomizing gas to catalyst injection nozzle 104.

In some embodiments, the liquid catalyst feed is provided to the catalyst injection nozzle 104 from a liquid catalyst storage tank 108, which is a vessel capable of discharging a liquid under pressure. In some embodiments, the liquid catalyst storage tank 108 comprises a pump with one or more pulsation dampeners to minimize the variability in instantaneous feed-rate. Examples of liquid catalyst storage tank 108 include, but are not limited to, pressure reactors, fluidization tanks, storage tanks, cylinders, pressure pots, and hoppers. In some embodiments, a liquid flow meter 112 is attached to the feed line carrying the liquid catalyst feed to catalyst injection nozzle 104 and is used to measure rate of flow of fluid feed. Examples of liquid flow meter 112 include, but are not limited to, venturi tubes, pitot tubes, orifice plates, vortex flowmeters, magnetic flow meters, and coriolis flow meters.

The process of manufacturing polymers using system 100 includes adding at least one monomer component into the polymerization reactor 102. Monomers are added using one or more inlets present on polymerization reactor 102. Examples of the monomers include, but are not limited to, $C_2$ to $C_{20}$ α-olefins, such as ethylene and propylene, and $C_6$ to $C_{20}$ dienes, such as cyclopentadiene, ethylidene norbornene, ethylidene norbornadiene, styrene, and butadiene.

The process of manufacturing polymers using system 100 includes injecting at least one liquid catalyst feed into the polymerization reactor 102. Examples of the liquid catalyst feed may include, for example, a solid supported catalyst such as a dispersed solid catalyst, a granular solid catalyst and an unsupported constrained geometry catalyst. In some embodiments, atomizing gas is used to convey and aspirate the liquid catalyst feed. Examples of the atomizing gas may include, but are not limited to, nitrogen, noble gases such as argon and helium, propylene, and supercritical $CO_2$.

In some embodiments, at least one additive may also be added to the polymerization reactor 102. In such embodiments, the additive may be an "agglomeration aid". The term "agglomeration aids" as used refers to any additive that inhibits polymer particles from sticking together. Examples of the agglomeration aids include, but are not limited to, silica, talc, and carbon black. The amount of carbon black added may range from about 5 pounds (2.3 kilograms) to about 35 pounds (15.9 kilograms) of carbon black per hundred parts polymer.

In some embodiments, at least one solvent may also be added to the polymerization reactor 102. Examples of solvents include, but are not limited to, methanol, acetone, and n-heptane.

Upon injecting the liquid catalyst feed through the catalyst injection nozzle 104 into the polymerization reactor 102, the at least one monomer at gas phase polymerization conditions is contacted with the liquid catalyst and polymerizes, producing a resultant polymer. In some embodiments, the polymer may be comprised of homopolymers such as an ethylene-based polymer or a propylene-based polymer. In other embodiments, the polymer may be comprised of an interpolymer of one or more different monomers such as olefins and dienes. In some such embodiments, the polymer may be an EPDM rubber. In other embodiments, the polymer may comprise about 4.5 weight percent ethylidene norbornene and about 69 weight percent ethylene polymer based upon the total weight of the polymer. In such embodiments, the viscosity of the polymer may be about 85 Mooney units. In another embodiment, the polymer composition is an interpolymer comprised of about 20 to about 95 weight percent ethylene or propylene and up to about 10 weight percent diene monomer based upon the total weight of the polymer.

Figure 2:
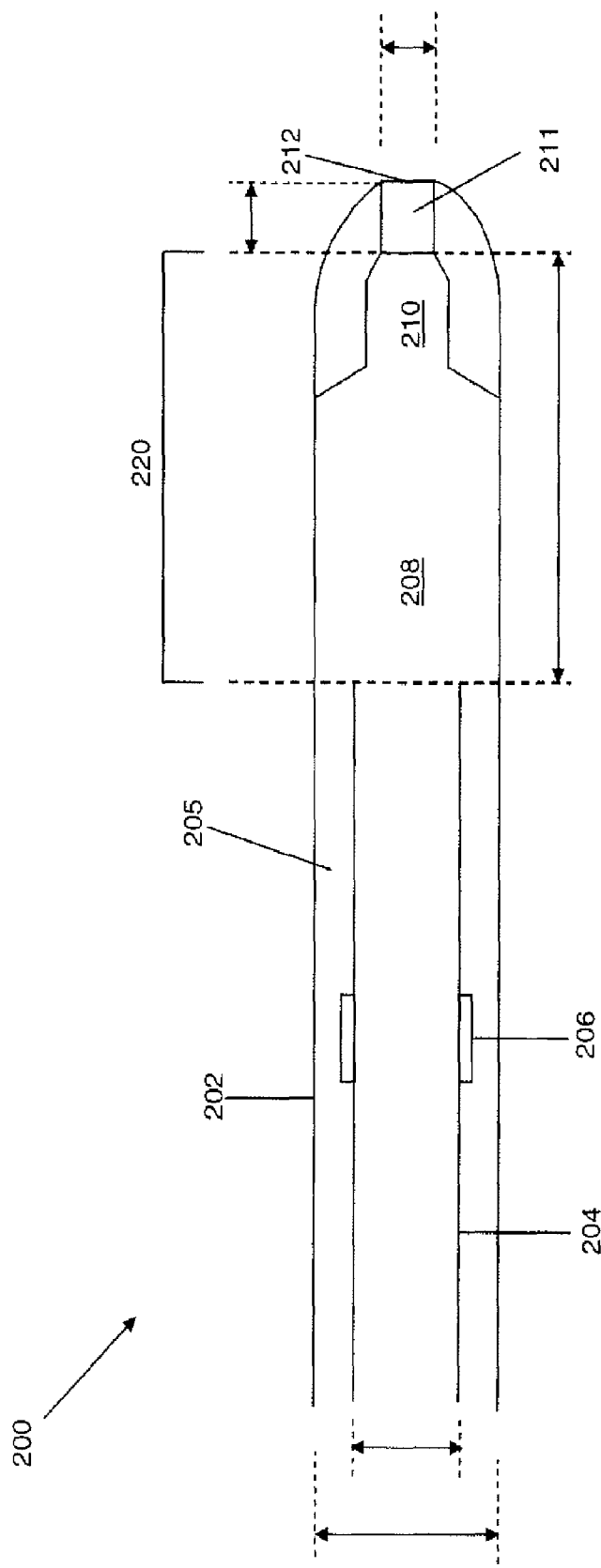
FIG. 2 illustrates the various elements of an embodiment of the catalyst injection nozzle.

FIG. 2 illustrates an embodiment of a catalyst injection nozzle 104 used in system 100. A catalyst injection nozzle 200 is comprised of an outer tube 202, an inner tube 204, annulus space 205, one or more centering lugs 206, an internal mixing chamber 208, a mixing zone 210, an orifice 211, and a nozzle tip 212.

As described previously, embodiments of a catalyst injection nozzle 104 may be used to inject liquid catalyst into the polymerization reactor 102. In various embodiments, the gas-assisted liquid catalyst feed may comprise at least one liquid catalyst and an atomizing gas. Examples of types of liquid catalysts include but are not limited to liquid catalysts and slurry-based catalysts. Examples of the liquid catalyst may include a metallocene catalyst and a Ziegler-Natta type catalyst. Examples of the atomizing gas may include, but are not limited to, nitrogen, noble gases such as argon and helium, propylene, and supercritical $CO_2$.

In some embodiments, the liquid catalyst feeds into the catalyst injection nozzle 200 and is mixed with an atomizing gas in a specific ratio. In some embodiments, the ratio of the atomizing gas to the liquid catalyst feed, or the atomizing gas:liquid catalyst ratio is from about 0.05 to about 10, and preferably is from about 0.1 to about 2.

In some embodiments, the outer tube 202 carries the atomizing gas and the inner tube 204 carries the liquid catalyst feed. The atomizing gas and the liquid catalyst feed are mixed in the internal mixing chamber 208, further mixed and compressed together in the mixing zone 210 before being aspirated into polymerization reactor 102 via orifice 211. The liquid flow in inner tube 204 may exhibit annular flow in some embodiments. In some embodiments, either or both outer tube 202 or inner tube 204 may be made from 316 stainless steel.

In some embodiments, the outer tube 202 and the inner tube 204 may be concentric. In some embodiments, the diameter of the outer tube 202 may be related to the diameter of the inner tube 204 to forum an annulus space 205 between the outer tube 202 and the inner tube 204. In such embodiments, the atomizing gas flows in the annulus space 205 between outer tube 202 and the inner tube 204. In some embodiments, the outer tube 202 has a diameter of about 0.1 inches (2.5 millimeters) to about 0.5 inches (12.7 millimeters). In certain embodiments, the diameter of the outer tube 202 is about 0.25 inches (6.4 millimeters). In some embodiments, the inner tube 204 has a diameter of about 0.05 inches (1.3 millimeters) to about 0.25 inches (6.4 millimeters). In certain embodiments, the diameter of inner tube 204 is about 0.125 inches (3.2 millimeters). In some embodiments, the wall of each tube has a thickness of about 0.028 inches (0.7 millimeters). In some embodiments, the ratio of the diameter of outer tube 202 to inner tube 204 is from about 1.5 to about 3, and preferably is about 2.

Embodiments of the catalyst injection nozzle 200 may include an inner tube 204 supported by at least one centering lug 206. Centering lug 206 may be made from materials including, but not limited to, copper, iron, silver, or plastic. The end of inner tube 204 proximate to the catalyst injection nozzle 200 is connected to the internal mixing chamber 208.

Internal mixing chamber 208 allows for the turbulent mixing of the atomizing gas and the liquid catalyst feed as the two separate flows suddenly combine. In some embodiments, the length along the flow channel of the internal mixing chamber 208 may be in the range of about 0.25 inches (6.4 millimeters) to about 1 inch (25.4 millimeters), and preferably is about 0.5 inches (12.7 millimeters).

Internal mixing chamber 208 is connected to mixing point 210. Mixing point 210 is where the mixture of the atomizing gas and the liquid catalyst feed from the internal mixing chamber 208 passes through a constricted area, compresses, and combines into a gas-assisted liquid catalyst feed. Mixing point 210 is proximate with nozzle tip 212.

Embodiment catalyst injection nozzles prevent a uniform gas/liquid dilute two-phase flow regime from forming within the gas-assisted liquid catalyst feed. The formation of a uniform gas/liquid dilute two-phase flow regime results in increased variability of the ratio of liquid to gas that is injected into the polymerization reactor 102. The variability in liquid to gas mixture is due to a "pulsing" effect occurs in two-phase systems, especially gas/liquid systems. The pulsing occurs with liquid from the two-phase flow adheres to the wall of the tube through contact and condensation. In a two-phase system, a liquid layer builds on the walls of the tube while the gas phase continues unabated. Eventually, enough liquid accumulates to overcome the affects of the gas flow and is pulled together by the affects of gravity. As the liquid accumulates, the gas flow becomes hindered. The gas flow now has to work to move the condensed liquid aside so it may continue to traverse the tube. As the gas loses energy pushing the condensed liquid, the gas pressure decreases and velocity is reduced. As gas energy and velocity decreases, the condensed liquid moves back into position. The pulsing effect is from gas pushing liquid away from the gas flow and the liquid moving back into the gas flow path. Additionally, as the carrier gas loses energy and pressure drop increases, more entrained fluids in the gas drop out and accumulate in the liquid phase, further exacerbating the problem.

Embodiment catalyst injection nozzles prevent this condition from forming by segregating the liquid catalyst feed from the atomizing gas until it is necessary to combine the two together to effect aspiration through the orifice 211 into polymerization reactor 102. By keeping the two feeds separated until a point of necessary mixing, a liquid phase is prevented from forming on the walls of outer tube 202 that would hinder the progress of the atomization gas in carrying out liquid catalyst feed. Since the atomizing gas in embodiment nozzles does not have to work against a condensing liquid as it would as previously described, a systemic pulse effect is not formed. Since a pulse is not formed in embodiment nozzles, both a steady flow of atomizing gas and better control over the gas to liquid feed ratios may be maintained. Additionally, since the atomizing gas in the embodiment nozzles does not have to continually work against a liquid condensate, less gas may be used to effect the aspiration of the liquid catalyst than required under similar conditions in a prior art nozzle. Steady flow and better control of the catalyst feed results in a lower gas to liquid ratio required. These properties affect the drop size distribution of liquid catalyst feed within the gas-assisted liquid catalyst feed introduced into the polymerization reactor 102 as well as conservation of atomizing gas.

The additive length of the internal mixing chamber 208 and the mixing zone 210 along the flow channel, which together forms an internal mixing zone 220, is optimized to avoid development of a pulse flow regime before injection of the catalyst component into the polymerization reactor 102. A systemic pulse flow regime is avoided because the distance between the proximate end of the inner tube 204 and the beginning of the orifice 211 at the feed velocities of the liquid catalyst feed and atomizing gas does not permit the formation of a steady-state, uniform two-phase flow (i.e., gas and liquid) regime. As previously stated, the ratio of the atomizing gas to the liquid catalyst feed, or the atomizing gas:liquid catalyst ratio, is from about 0.05 to about 10. This feed ratio with this structure of catalyst injection nozzle 200 avoids systemic pulse flow formation.

The distance of mixing point 210 away from the proximate end of the inner tube 204 is controlled to reduce the variability in flow of the mixture of atomizing gas and the liquid catalyst by acting as a flow dampener. In some embodiments, the distance between the start of internal mixing chamber 208 (at the proximate end of the inner tube 204) and the end of mixing point 210 (at the entry to the orifice 211), which reflects the length of internal mixing zone 220 along the flow channel, is from about 0.5 inches (12.7 millimeters) to about 1.5 inches (38.1 millimeters), and preferably is about 1.0 inch (25.4 millimeters).

Orifice 211 and nozzle tip 212 form an opening at the end of catalyst injection nozzle 200 from which the feed is introduced into the polymerization reactor 102. In some embodiments, the size of nozzle tip 212 is about 0.065 inches (1.65 millimeters) in diameter. In some embodiments, the length of the orifice 211 to the diameter of nozzle tip 212 ranges from about 500:1 to about 0.1:1.

In some embodiments, the orifice 211 and the nozzle tip 212 enables atomization of the catalyst feed. The relative velocity of the liquid catalyst feed in inner tube 204 and the discharge flow-rate from the nozzle tip 212 are controlled to achieve a target drop size distribution of the liquid catalyst feed. The atomization gas velocity influences the size of the particle lean zone created at nozzle tip 212. In some embodiments, the liquid catalyst feed flowing through nozzle tip 212 may exhibit dispersed flow.

Embodiment catalyst injection nozzles are independent of the kind of liquid catalyst feed. Embodiments such as catalyst injection nozzle 200 reduce pulsations in the liquid catalyst feed injected, and thereby provides better control over the pressure of the feed flow, into the polymerization reactor 102.

Embodiment catalyst injection nozzles provide a substantially narrow drop size distribution of the liquid catalyst feed injected, which, in turn, is reflected in the particle size distribution of the resultant polymer. The narrow drop size distribution of the liquid catalyst feed results in a reduction in the formation of agglomerates and fines.

In some embodiments, the catalyst injection nozzle 200 has a ratio of upstream pressure to downstream pressure (also known as "pressure drop") in a range of from about 1.05:1 to about 2:1, and preferably from about 12:1 to about 1.5:1. The term "upstream pressure" refers to the pressure at mixing point 210 and the term "downstream pressure" refers to the pressure in polymerization reactor 102.

A controlled drop size distribution of the liquid catalyst feed in the gas-assisted liquid catalyst feed results in a substantially narrow D-ratio of the friable olefin polymer produced within the polymerization reactor 102. The term "D-ratio" refers to the unfiltered mass averaged PSD of the olefin polymer composition. The closer D-ratio is to zero, the narrower the span of the PSD. The D-ratio is defined as:

$$DRatio = \frac{(D90 - D10)}{D50} \qquad \text{(Eq. 1)}$$

where "D50" as used refers to the size of a theoretical sieve hole that allows 50% of the particles through by weight. Similarly, "D90" refers to the size of a hole in the sieve that allows 90% of the particles through by weight and "D10" is the size of the sieve that allows 10% of the particles through by weight. In some embodiments, the D-ratio of the olefin polymer composition produced ranges from about 1.5 to about 3.5.

In some embodiments, the resultant unfiltered particle size distribution of the resultant polymer may be from about 125 microns to about 12,700 microns.

Figure 3:
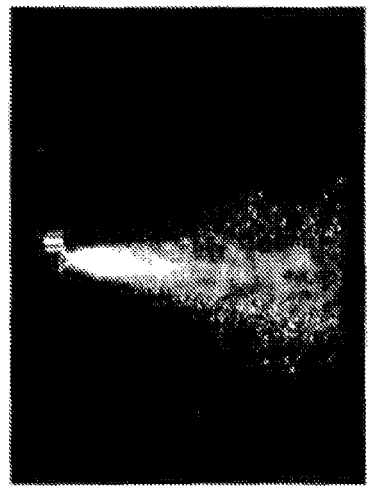
FIG. 3 illustrates spray patterns obtained by various catalyst injection nozzles, including embodiment nozzles.
Figure 3:
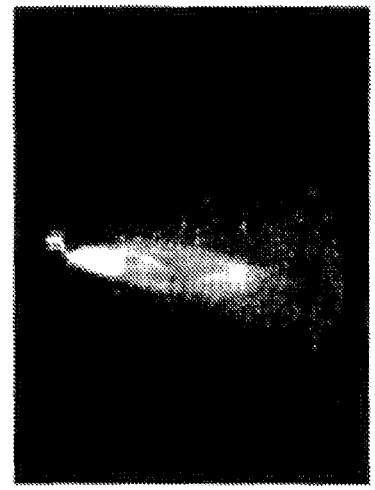
Figure 3:
Figure 3:
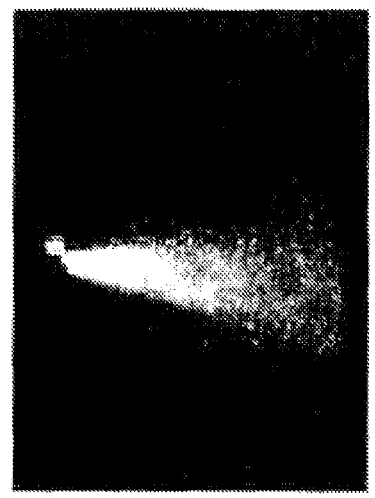

FIG. 3 illustrates spray patterns of gas-assisted liquid catalyst feed obtained by various catalyst injection nozzles, including embodiment nozzles. FIG. 3a is an image of a spray pattern as obtained by a standard nozzle known in the prior art. FIG. 3b is an image of a spray pattern as obtained by a tube-in-tube type nozzle representative of the embodiment catalyst injection nozzles. The tube-in-tube nozzle may be similar to catalyst injection nozzle 200 as illustrated in FIG. 2 and as previously described. FIG. 3c is an image of a spray pattern as obtained by a tube-in-tube type nozzle under "base conditions" while carrying water at 30 lbs/hr (13.6 kg/hr). FIG. 3d is an image of a spray pattern as obtained by a tube-in-tube type nozzle representative of the embodiments under a reduced flow rate from base conditions of atomizing gas and carrying water at 30 lbs/hr (13.6 kg/hr). For FIG. 3d, the flow rate of the atomizing gas is reduced to an amount equal to about 60% of the base conditions.

Figure 4:
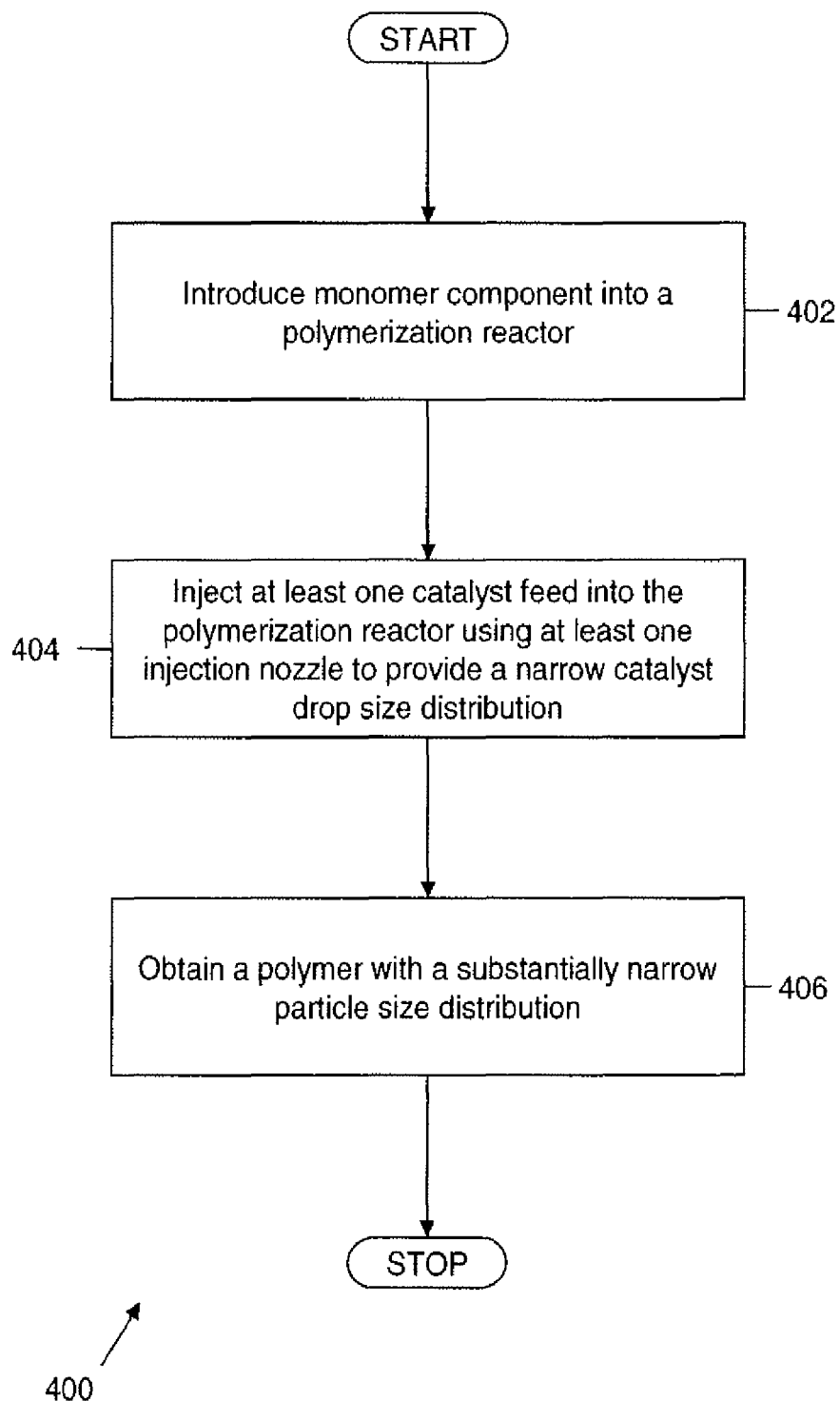
FIG. 4 illustrates a flowchart of an embodiment method for producing one or more polymers.

FIG. 4 illustrates a flowchart of an embodiment method 400 for producing one or more polymers. Embodiment method 400 may be carried out using an embodiment system such as system 100 with at least one embodiment nozzle such as catalyst injection nozzle 200. At step 402 of the embodiment method, at least one monomer component is injected into a polymerization reactor. In embodiment methods, the monomer component may include ethylene, propylene, cyclopentadiene, ethylidene norbornene, ethylidene norbornadiene, styrene, butadiene, and mixtures thereof. In some embodiment methods, the monomer components may further comprise one or more solvents and additives such as agglomeration aids. In some embodiments, step 402 may also include adjusting the reaction conditions such as temperature and pressure within a polymerization reactor to enable a polymerization reaction. In an embodiment, the polymerization reactor is similar to polymerization reactor 102.

At step 404 of the embodiment method shown in FIG. 4, a gas-assisted liquid catalyst feed comprising at least one atomizing gas and at least one liquid catalyst is injected into the polymerization reactor. In an embodiment, the gas-assisted liquid catalyst feed is injected at a substantially constant and steady flow-rate. The term "substantially constant and steady flow rate" as used refers to fluid flow lacking significant pulsations. A gas-assisted liquid catalyst feed flow lacking significant pulsation is achieved by reducing the time allowed for mixing of the atomizing gas and the liquid catalyst feed, thereby preventing the formation of a developed two-phase flow. To further minimize the effect, means such as one or more pulsation dampeners and constant-flow pumps may be used in embodiment methods to achieve a constant liquid catalyst flow rate.

At step 406 of the embodiment method shown in FIG. 4, a final polymer is obtained. The final polymer is a substantially friable olefin polymer composition having an absence of catalyst support and further having a narrow particle size distribution. The term "substantially friable" means that most, if not all, of the solid particles of the olefin polymer composition are easily crumbled or reduced to a powder-like form with a small application of pressure or force, such as manipulation by hand. The step of injecting (step 402) provides a substantially narrow catalyst drop size distribution. The substantially narrow catalyst drop size distribution results in a substantially narrow unfiltered particle size distribution of the olefin polymer. In an embodiment of the present invention, the unfiltered mass average particle size distribution, or D-ratio, of the final polymer is from about 1.5 to about 3.5.

In some embodiments, the final olefin polymer composition has a weight average molecular weight ranging from about 100,000 to about 5,000,000 grams per mole, preferably from about 250,000 to about 5,000,000 grams per mole, and more preferably from about 500,000 to about 4,000,000 grams per mole. It is to be noted that the range of particle size distribution of the resultant polymer is determined before any step of sieving or filtration.

In some embodiments, the final polymer is an olefin polymer. In some embodiments, the polymer may be an interpolymer of $C_2$ to $C_{10}$ α-olefins and $C_6$ to $C_{20}$ dienes and, in some embodiments, may also include one or more crosslinked chains. In some embodiment, the polymer composition may comprise from about 20 weight percent to about 95 weight percent ethylene or propylene or a mixture thereof based upon the total weight of the polymer. In some embodiments, the polymer composition may include up to about 10 weight percent diene monomer based upon the total weight of the polymer.

Examples of the resultant polymer may include, but are not limited to, polyethylene, polypropylene, EPDM rubber, and mixtures thereof.

EXAMPLES

A comparison is made between the performance of an embodiment nozzle and a standard nozzle known in the prior art at corresponding process conditions. The "standard nozzle" is a nozzle as shown in FIG. 3. The embodiment nozzle is a "TnT nozzle" (tube-in-tube) of the type previously described and shown in FIG. 2.

TABLE 1

| Experimental conditions | | | | |
| --- | --- | --- | --- | --- |
| Test | Nozzle Type | G/L ratio | Shroud | CB(avg) |
| SB | Standard | 1.3 | 100 | 27.5 |
| A | TnT | 1.3 | 100 | 26.5 |
| B | TnT | 1.0 | 100 | 26.0 |
| C | TnT | 0.7 | 100 | 26.5 |
| D | TnT | 0.5 | 100 | 26.5 |
| E | TnT | 0.5 | 150 | 26.7 |
| SA | Standard | 1.3 | 100 | 27.5 |

Table 1 lists the trial conditions for conducting the experiments. The terms "SB" and "SA" refer to "Standard Base" and to "Standard After", respectively, representing the conditions using the prior art nozzle. "A" through "E" refer to the conditions using the embodiment nozzle. "G/L ratio" is the atomization gas to liquid catalyst feed ratio. "CB(avg)" is the average carbon black feed set point.

For each experimental run, a 12-hour period is used in an attempt to establish steady-state reaction and feed conditions. At the end of each 12-hour period, a resultant polymer sample is collected, the bulk properties analyzed, and process conditions changed to the next test condition. It is noted that typically for the operating system used that steady-state reaction and feed conditions may require up to 72 hours of continuous operation.

Figure 5:
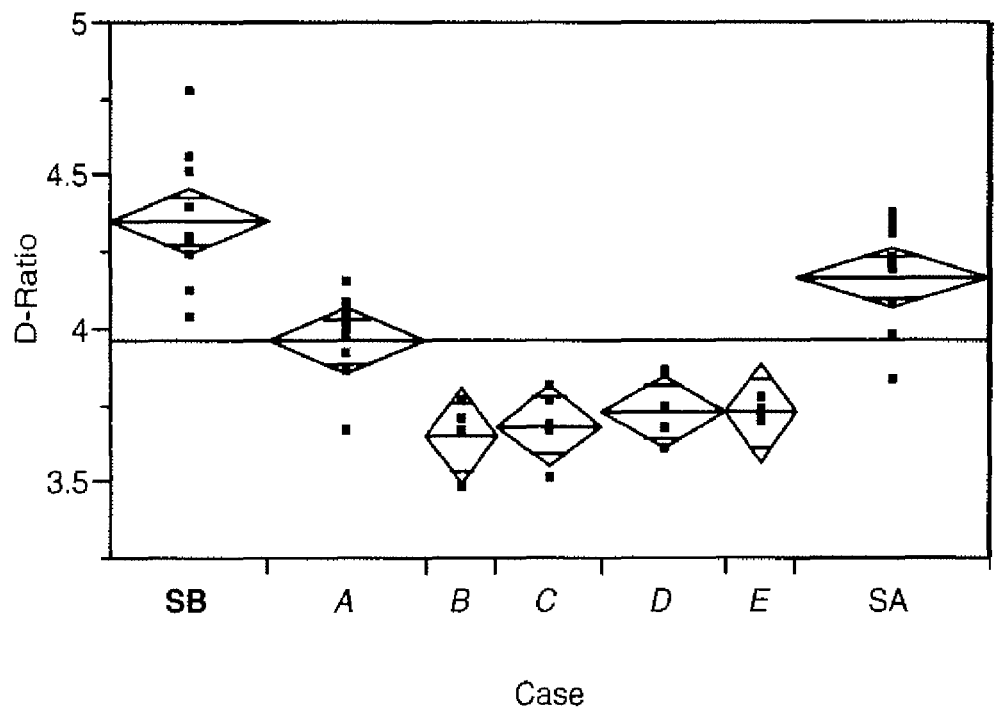
FIG. 5 is a graph illustrating the change in nozzle type and process conditions on the D-ratio of the resultant polymer.

FIG. 5 is a graph illustrating the effect of nozzle type and process conditions on the D-ratio of the resultant polymer. The seven trial conditions in Table 1 are plotted versus the D-ratio values. As can be seen with FIG. 5, the D-ratio of the resultant polymer is reduced when an embodiment nozzle is used. A decrease in D-ratio indicates a narrower particle drop size distribution.

Figure 6:
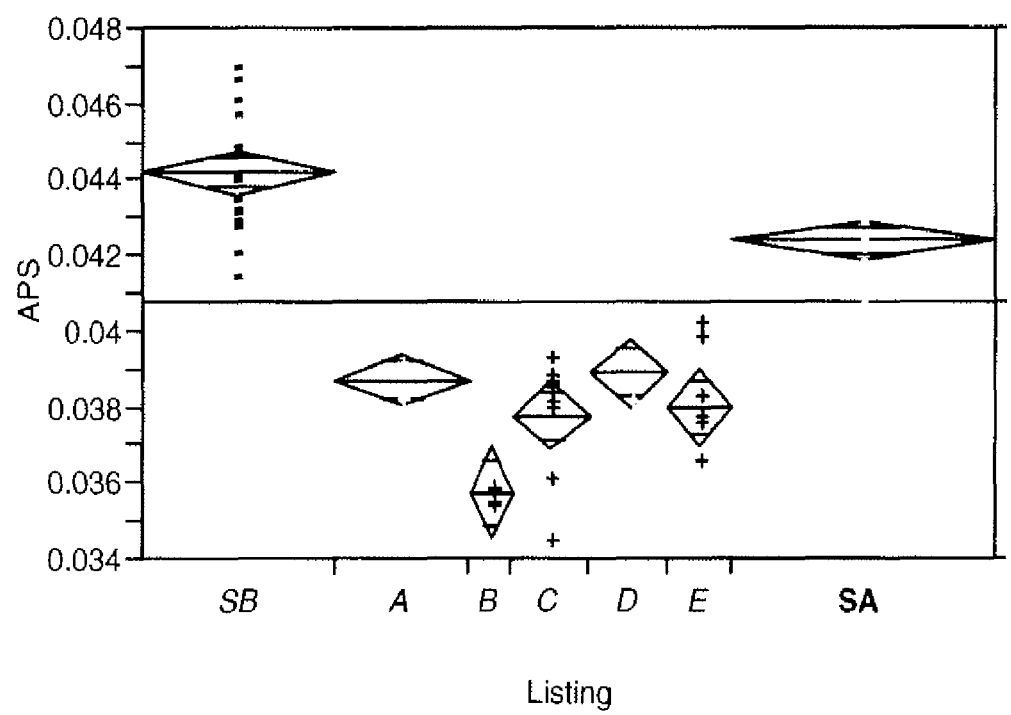
FIG. 6 is a graph illustrating the effect of the change in nozzle type and process conditions on the average particle size (APS) of the resultant polymer.

FIG. 6 is a graph illustrating the effect of nozzle type and process conditions on the average particle size (APS) of the resultant polymer. APS describes the size of particle size distribution based on the weight of the polymer product. FIG. 6 shows that the APS of the resultant polymer is reduced when the embodiment nozzle is used for all processing conditions given in Table 1. The APS was calculated based on sieve analysis and assuming a linear distribution on size of polymer particles.

Figure 7:
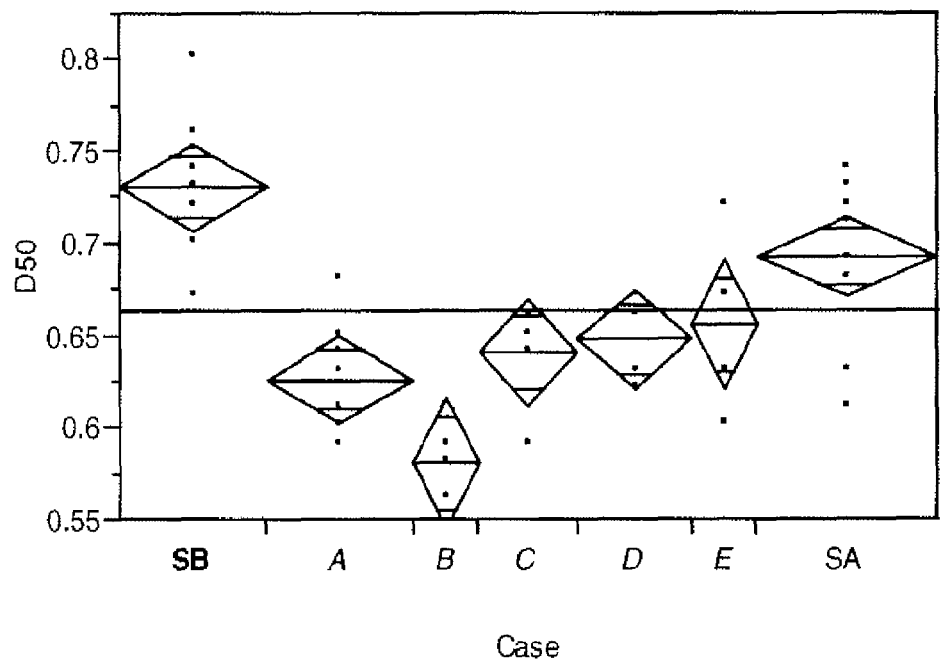
FIG. 7 is a graph illustrating the effect of the change in nozzle type and process conditions on the D50 of the resultant polymer.

FIG. 7 is a graph illustrating the effect of nozzle type and process conditions on the D50 of the resultant polymer. D50 is calculated in millimeters and assuming logarithmic calculation. As FIG. 7 illustrates, D50 is reduced for all conditions using the embodiment nozzle versus the standard nozzle.

Figure 8:
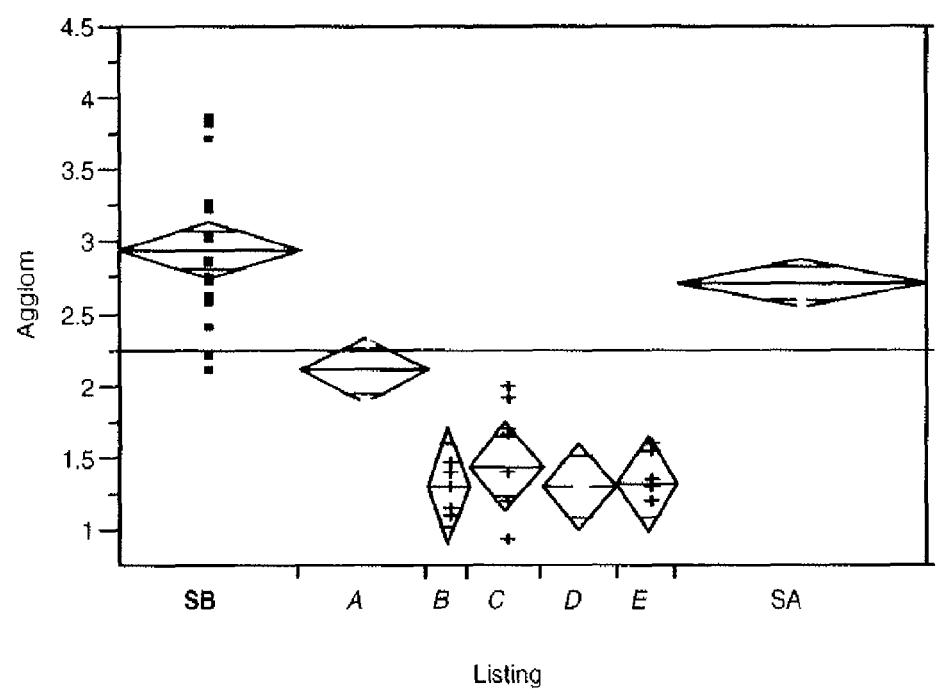
FIG. 8 is a graph illustrating the effect of the change in nozzle type and process conditions on the agglomerate (Agglom) formation in the resultant polymer.

FIG. 8 is a graph illustrating the effect of the change in nozzle type and process conditions on the agglomerate (Agglom) formation in the resultant polymer. The graph depicts that embodiment tube-in-tube nozzle significantly affects the agglomerate formation compared to the prior art nozzle, even at reduced gas flow conditions.

The results show that even at reduced gas flow conditions, an embodiment nozzle produces a resultant polymer with a narrow particle size distribution versus a standard nozzle. The D-ratio of the resultant polymer varied from a nominal 4.2 on a standard nozzle to 3.8 using the embodiment tube-in-tube type nozzle—about a 10% reduction. The D90 varied from a nominal 3.2 mm to 2.55 mm using the embodiment tube-in-tube type nozzle—a reduction of more than 20% in large particles. The frequency of particles of at least 0.25 inches (6.4 millimeters) in diameter—agglomerates—is reduced.

All patents, test procedures, and other documents cited, including priority documents, are fully incorporated by reference to the extent such disclosure is not inconsistent with this invention and for all jurisdictions in which such incorporation is permitted.

While embodiments of the invention have been described with particularity, it will be understood that various other modifications will be apparent to and can be readily made by those skilled in the art without departing from the spirit and scope of the invention. Accordingly, it is not intended that the scope of the claims appended be limited to the examples and descriptions set forth but rather that the claims be construed as encompassing all the features of patentable novelty which reside in the present invention, including all features which would be treated as equivalents thereof by those skilled in the art to which the invention pertains.

When numerical lower limits and numerical upper limits are listed, ranges from any lower limit to any upper limit are contemplated.

In the description, all numbers disclosed are approximate values, regardless whether the word "about" or "approximate" is used. Depending upon the context in which such values are described, and unless specifically stated otherwise, such values may vary by 1 percent, 2 percent, 5 percent, or, sometimes, 10 to 20 percent. Whenever a numerical range with a lower limit, RL, and an upper limit, RU, is disclosed, any number falling within the range is specifically disclosed. In particular, the following numbers (R) within the range are specifically disclosed: R=RL+k*(RU−RL), wherein k is a variable ranging from 0.01 to 1.0 with a 0.01 percent increment, i.e., k is 0.01 or 0.02 or 0.03 to 0.99 or 1.0. Moreover, any numerical range defined by two R numbers as defined above is also specifically disclosed.

What is claimed is:

1. A catalyst injection nozzle, comprising the following:
an outer tube with an open end;
a nozzle tip with a diameter connected to the outer tube open end;
an orifice connected to the nozzle tip internal to the outer tube;
an internal mixing zone connected to the orifice internal to the outer tube;
an inner tube residing within the outer tube further comprising an open end connected to the internal mixing zone; and
wherein the dimensions of internal mixing zone and inner tube are optimized, such that a steady-state, uniform two-phase flow regime, between an atomizing gas and at least one liquid catalyst feed, does not form in the internal mixing zone at an atomizing gas to liquid catalyst feed flow ratio from about 0.05 to about 10.

2. The nozzle of claim 1, where the axial length of the orifice to the diameter of nozzle tip is from about 500:1 to about 0.1:1.

3. The nozzle of claim 1, where the at least one liquid catalyst feed comprises at least one of a liquid catalyst and a slurry-based catalyst.

4. The nozzle of claim 1, where the atomizing gas is selected from the group comprising nitrogen, propylene, a noble gas, a supercritical fluid, and combinations thereof.

5. A method for producing a polymer in a gas phase polymerization reactor with at least one catalyst injection nozzle of claim 1, comprising:
feeding at least one monomer into the gas phase polymerization reactor,
injecting at least one liquid catalyst with an atomizing gas through the at least one catalyst feed nozzle into the polymerization reactor,
where injecting the at least one liquid catalyst at gas phase polymerization conditions initiates a polymerization reaction with the at least one monomer, and
where the at least one liquid catalyst is selected from the group comprising a liquid catalyst, a slurry-based catalyst, and a combination thereof.

6. The method of claim 5, where the at least one liquid catalyst is selected from the group comprising a Ziegler-Natta catalyst and a metallocene catalyst.

7. The method of claim 5, where the atomizing gas is selected from the group comprising nitrogen, propylene, a noble gas, a supercritical fluid, and combinations thereof.

8. The method of claim 5, where the atomizing gas and at least one liquid catalyst are injected at a ratio of about 0.05 to about 10.

9. The method of claim 5, where the at least one monomer is selected from the group comprising C2 to C20 a-olefins and C6 to C20 dienes.

10. The method of claim 9, where the dienes are selected from the group comprising cyclopentadiene, ethylidene norbornene, ethylidene norbornadiene, styrene, butadiene, and combinations thereof.

11. The method of claim 5, where the method further comprises adding one or more agglomeration aids to the polymerization reactor.

12. The method of claim 11, where the one or more agglomeration aids is carbon black.

13. The method of claim 12, where the ratio of carbon black to the polymer ranges from about 5 to about 35 pounds carbon black per hundred parts polymer.

* * * * *